United States Patent
Sugiyama et al.

(10) Patent No.: US 11,870,237 B2
(45) Date of Patent: Jan. 9, 2024

(54) SURGE SUPPRESSION CIRCUIT AND ROTATING ELECTRICAL MACHINE

(71) Applicant: Hitachi Metals, Ltd., Tokyo (JP)

(72) Inventors: Yuta Sugiyama, Tokyo (JP); Haruyasu Komano, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 40 days.

(21) Appl. No.: 17/677,501

(22) Filed: Feb. 22, 2022

(65) Prior Publication Data

US 2022/0285929 A1    Sep. 8, 2022

(30) Foreign Application Priority Data

Mar. 5, 2021 (JP) .................................. 2021-035125
Jan. 6, 2022 (JP) .................................. 2022-000819

(51) Int. Cl.
*H02H 3/08* (2006.01)
*H02M 1/32* (2007.01)

(52) U.S. Cl.
CPC .............. *H02H 3/083* (2013.01); *H02M 1/32* (2013.01)

(58) Field of Classification Search
CPC .......... H02M 1/32; H02M 1/348; H02M 1/36; H02M 7/003; H02M 7/5387; H02H 3/083; H02H 9/04

(Continued)

(56) References Cited

U.S. PATENT DOCUMENTS

| | | | |
|---|---|---|---|
| 2008/0054831 A1* | 3/2008 | Cook ..................... | H02P 29/032 318/434 |
| 2014/0217946 A1* | 8/2014 | Kume ................... | H02P 25/188 318/497 |
| 2015/0366111 A1* | 12/2015 | Yagi ........................ | H02M 1/44 174/350 |

FOREIGN PATENT DOCUMENTS

| | | |
|---|---|---|
| JP | H0757067 B2 * | 6/1995 |
| JP | 2008-283755 A | 11/2008 |
| JP | 2008283755 A * | 11/2008 |

OTHER PUBLICATIONS

Machine translation of Jofu Japanese Patent Document JP H07-57067 B2 Jun. 14, 1995 (Year: 1995).*

(Continued)

*Primary Examiner* — Kevin J Comber
(74) *Attorney, Agent, or Firm* — Thomas W. Cole; Calderon Safran & Cole P.C.

(57) ABSTRACT

A surge suppression circuit is used in a rotating electrical machine system including a switching circuit composed of a plurality of switching elements and a rotating electrical machine connected thereto via an electrically conducting path comprising a plurality of electrically conductive bodies. The surge suppression circuit suppresses surge voltage generated in a plurality of connecting lines connecting the plurality of electrically conductive bodies to windings of plural phases of the rotating electrical machine. The surge suppression circuit includes a plurality of upper diodes with anodes respectively connected to the plurality of connection lines, a plurality of lower diodes with cathodes respectively connected to the plurality of connection lines, an upper line connected to respective cathodes of the plurality of upper diodes, a lower line connected to respective anodes of the plurality of lower diodes, and a voltage holding circuit connected between the upper line and the lower line. The (Continued)

voltage holding circuit includes a charging unit to store electric charge by the surge voltage and a discharge unit to discharge the electric charge stored in the charging unit.

7 Claims, 6 Drawing Sheets

(58) Field of Classification Search
USPC .......................................................... 361/93.1
See application file for complete search history.

(56) References Cited

OTHER PUBLICATIONS

Machine Translation of Hayashi et al Japanese Patent Document JP 2008-283755 A Nov. 20, 2008 (Year: 2008).*

* cited by examiner

SURGE SUPPRESSION CIRCUIT AND ROTATING ELECTRICAL MACHINE

CROSS-REFERENCE TO RELATED APPLICATIONS

The present patent application claims the priority of Japanese patent application No. 2021-35125 filed on Mar. 5, 2021 and Japanese patent application No. 2022-000819 filed on Jan. 6, 2022, and the entire contents thereof are hereby incorporated by reference.

TECHNICAL FIELD

The present invention relates to a surge suppression circuit and a rotating electrical machine provided therewith.

BACKGROUND ART

Rotating electrical machine systems which includes a switching circuit having plural switching elements and a rotating electrical machine have been conventionally used in various applications including drive devices for vehicles. A typical switching circuit is an inverter that generates AC current by switching DC voltage, and a typical rotating electrical machine is a three-phase AC motor. The switching circuit and the motor are connected via an electrical cable having plural electric wires.

In such rotating electrical machine systems, it is difficult to match impedances of the electrical cable and the rotating electrical machine since reactance of windings of the rotating electrical machine is large, and when a difference between the impedance of the electrical cable and the impedance of the rotating electrical machine is large, reflections due to impedance mismatch occur at the input end of the rotating electrical machine and a large surge voltage is generated. Then, when such surge voltage is too high, it may cause damage due to occurrence of discharge, etc., in the rotating electrical machine.

Patent Literature 1 describes a surge suppression circuit to suppress generation of surge caused by reflections due to impedance mismatch.

CITATION LIST

Patent Literature

Patent Literature 1: JP 2008-283755A

SUMMARY OF THE INVENTION

FIG. 6 is a circuit diagram illustrating one of the surge suppression circuits described in Patent Literature 1. In FIG. 6, a three-phase AC motor 7 has a rotor 71 having an N pole 711 and an S pole 712, and a stator 72 having U-, V- and W-phase windings 721, 722, 723. Three phase currents are supplied to the stator 72 via first to third connection lines 81, 82, 83.

A surge suppression circuit 9 has a first series circuit 91 in which a first resistor 911 and a first capacitor 912 are connected in series, a second series circuit 92 in which a second resistor 921 and a second capacitor 922 are connected in series, and a third series circuit 93 in which a third resistor 931 and a third capacitor 932 are connected in series. Respective ends of the first to third series circuits 91-93 on one side are connected to the first to third connection lines 81, 82, 83, and the respective other ends are connected to a neutral point N of an inverter via a fourth connection line 84.

In case of such a surge suppression circuit 9, surge voltage generated in the first to third connection lines 81, 82, 83 is absorbed by the first to third capacitors 912, 922, 932, but since the first to third capacitors 912, 922, 932 are charged and discharged also by U-phase voltage, V-phase voltage and W-phase voltage, power consumption of the first to third resistors 911, 921, 931 increases, resulting in a large power loss. In addition, a cooling structure for heat dissipation, such as fins or fans, is large since temperature of the first to third resistors 911, 922, 932 becomes high.

Therefore, it is an object of the invention to provide a surge suppression circuit capable of suppressing surge voltage while suppressing power loss, and a rotating electrical machine provided therewith.

So as to achieve the above object, one aspect of the invention provides: a surge suppression circuit that is configured to be used in a rotating electrical machine system comprising a switching circuit comprising a plurality of switching elements and a rotating electrical machine connected thereto via an electrically conducting path comprising a plurality of electrically conductive bodies, and suppresses surge voltage generated in a plurality of connecting lines connecting the plurality of electrically conductive bodies to windings of plural phases of the rotating electrical machine, the surge suppression circuit comprising:
   a plurality of upper diodes with anodes respectively connected to the plurality of connection lines;
   a plurality of lower diodes with cathodes respectively connected to the plurality of connection lines;
   an upper line connected to respective cathodes of the plurality of upper diodes;
   a lower line connected to respective anodes of the plurality of lower diodes; and
   a voltage holding circuit connected between the upper line and the lower line,
   wherein the voltage holding circuit comprises a charging unit to store electric charge by the surge voltage and a discharge unit to discharge the electric charge stored in the charging unit.

Further, so as to achieve the above object, another aspect of the invention provides: a rotating electrical machine to be connected to a switching circuit comprising a plurality of switching elements via an electrically conducting path comprising a plurality of electrically conductive bodies, the rotating electrical machine comprising:
   a rotating electrical machine main body comprising windings of plural phases;
   a plurality of connection lines to connect the plurality of electrically conductive bodies to the windings of plural phases; and
   a surge suppression circuit to suppress surge voltage generated in the plurality of connecting lines,
   wherein the surge suppression circuit comprises a plurality of upper diodes with anodes respectively connected to the plurality of connection lines, a plurality of lower diodes with cathodes respectively connected to the plurality of connection lines, an upper line connected to respective cathodes of the plurality of upper diodes, a lower line connected to respective anodes of the plurality of lower diodes, and a voltage holding circuit connected between the upper line and the lower line, and wherein the voltage holding circuit comprises a charging unit to store electric charge by the surge voltage and a discharge unit to discharge the electric charge stored in the charging unit.

BEST MODE FOR CARRYING OUT THE INVENTION

Embodiment

Figure 1:
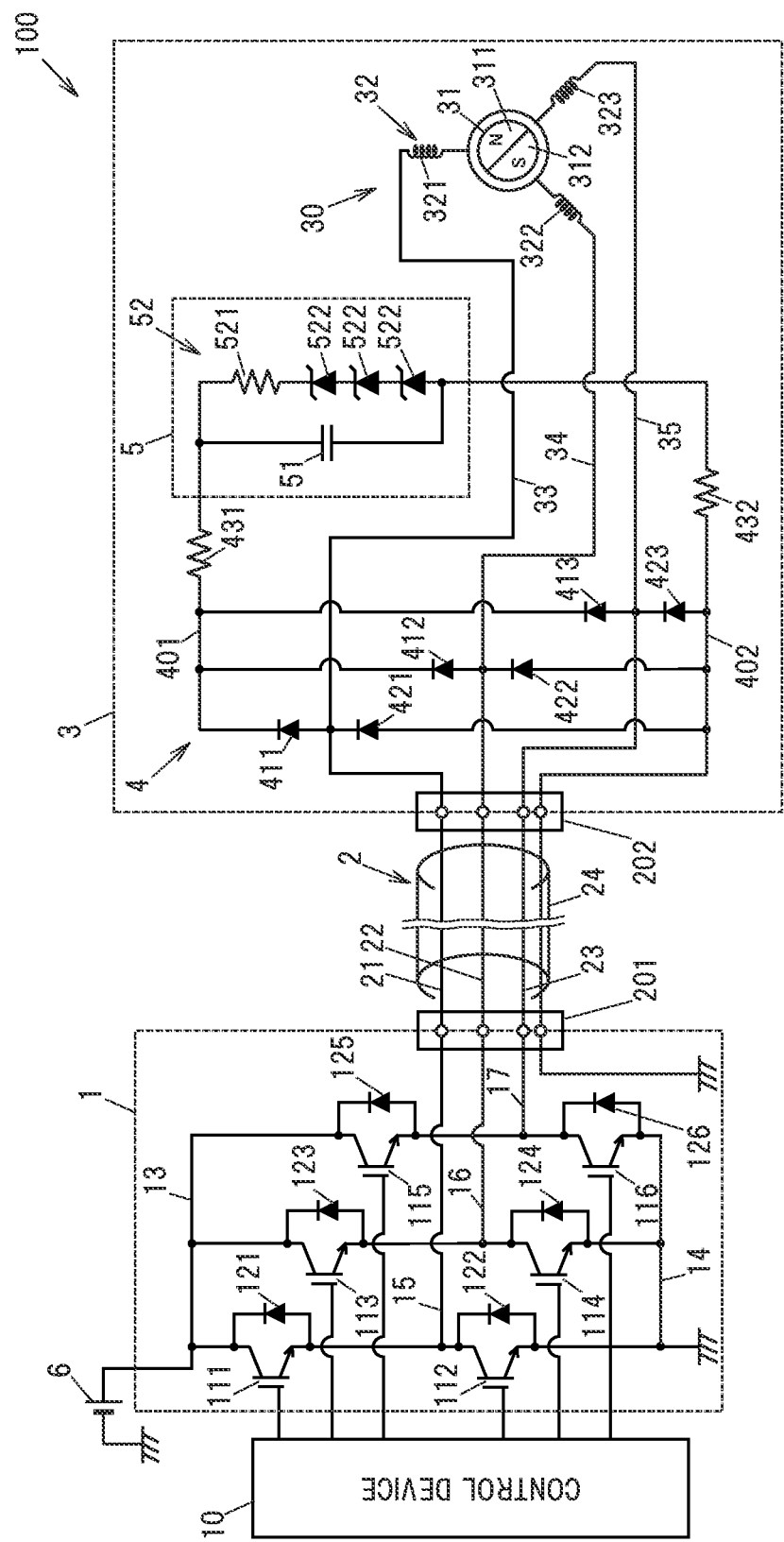
FIG. 1 is a circuit diagram illustrating a configuration of a rotating electrical machine system in an embodiment of the present invention.

FIG. 1 is a circuit diagram illustrating an example configuration of a rotating electrical machine system in an embodiment of the invention. This rotating electrical machine system 100 includes a switching circuit 1 that performs DC-AC conversion by switching plural switching elements, an electrical cable 2, and a rotating electrical machine 3 connected to the switching circuit 1 by the electrical cable 2. The rotating electrical machine system 100 is mounted on, e.g., an electric vehicle or a hybrid vehicle in which the rotating electrical machine 3 is used as a drive source of the vehicle.

In the present embodiment, the rotating electrical machine 3 is a three-phase AC motor and is used in both a power running mode to generate torque and a regeneration mode to regenerate power. In the power running mode, three-phase AC currents are output from the switching circuit 1 to the rotating electrical machine 3. In the regeneration mode, three-phase AC currents are output from the rotating electrical machine 3 to the switching circuit 1. In the power running mode, the switching circuit 1 acts as an inverter and generates three-phase AC currents by switching DC voltage. Next, an example in which the switching circuit 1 acts as an inverter will be described in detail.

The switching circuit 1 has first to sixth switching elements 111-116, and first to sixth diodes 121-126 respectively parallel-connected to the first to sixth switching elements 111-116. The first to sixth switching elements 111-116 are connected to form a three-phase bridge structure in which the first switching element 111 is series-connected to the second switching element 112, the third switching element 113 is series-connected to the fourth switching element 114, the fifth switching element 115 is series-connected to the sixth switching element 116, and these series circuits are connected in parallel between an upper bus wire 13 and a lower bus wire 14.

The upper bus wire 13 is connected to a DC power source 6 such as battery, and the lower bus wire 14 is electrically grounded. When the rotating electrical machine 3 is used as a drive source of the vehicle, output voltage of the DC power source 6 is, e.g., 500-1000V.

The first to sixth switching elements 111-116 are, e.g., IGBTs (Insulated Gate Bipolar Transistor) or power MOS-FETs, and are switched between the ON (conducted) state and the OFF (non-conducted) state by on/off signals output from a control device 10 that performs PWM control. A switching frequency of the first to sixth switching elements 111-116 is, e.g., 10 kHz.

The switching circuit 1 also has a U-phase output line 15, a V-phase output line 16 and a W-phase output line 17, and is configured such that the U-phase output line 15 is connected between the first switching element 111 and the second switching element 112, the V-phase output line 16 is connected between the third switching element 113 and the fourth switching element 114, and the W-phase output line 17 is connected between the fifth switching element 115 and the sixth switching element 116.

The electrical cable 2 has a U-phase wire 21, a V-phase wire 22, a W-phase wire 23, and a shield conductor 24 to shield these wires 21-23. The U-phase wire 21, the V-phase wire 22 and the W-phase wire 23 are, e.g., insulated wires in which a core wire composed of a stranded conductor is covered with an insulation, and the shield conductor 24 is, e.g., a braided wire formed by braiding plural strands in a grid pattern. The electrical cable 2 is one form of "the electrically conducting path", and the wires 21-23 are one form of "the plurality of electrically conductive bodies". As another form, the electrically conductive body may be a plate-shaped busbar. As further another form, the electrically conductive body may be a single electrical wire in which a core wire formed of a solid wire with a circular cross section is covered with an insulation. The wires 21-23 are flexible and the single electrical wires are not flexible (less bendable than the wires 21-23).

The U-phase wire 21, the V-phase wire 22 and the W-phase wire 23 are respectively connected to the U-phase output line 15, the V-phase output line 16 and the W-phase output line 17 of the switching circuit 1 via a connection portion 201 located on the switching circuit 1 side. The shield conductor 24 is electrically grounded on the switching circuit 1 side. The connection portion 201 is, e.g., a connector or a terminal block.

The rotating electrical machine 3 has a rotating electrical machine main body 30 and a surge suppression circuit 4. The rotating electrical machine main body 30 has a rotor 31 having an N pole 311 and an S pole 312, and a stator 32 having a U-phase winding 321, a V-phase winding 322 and a W-phase winding 323.

The rotating electrical machine 3 also has a U-phase connection line 33, a V-phase connection line 34 and a W-phase connection line 35. The U-phase connection line 33, the V-phase connection line 34 and the W-phase connection line 35 respectively connect the U-phase winding 321, the V-phase winding 322 and the W-phase winding 323 to the U-phase wire 21, the V-phase wire 22 and the W-phase wire 23 of the electrical cable 2. The rotating electrical machine 3 and the switching circuit 1 are thereby connected via the electrical cable 2. The U-phase connection line 33, the V-phase connection line 34 and the W-phase connection line 35 are respectively connected to the phase wire 21, the V-phase wire 22 and the W-phase wire 23 of the electrical cable 2 via a connection portion 202 located on the rotating electrical machine 3 side. The connection portion 202 is, e.g., a connector or a terminal block.

The surge suppression circuit 4 suppresses surge voltage that is generated due to reflections of voltage at ends of the U-phase winding 321, the V-phase winding 322 and the W-phase winding 323. Such reflections of voltage occur due to impedance mismatch between the electrical cable 2 and the stator 32 of the rotating electrical machine main body 30.

Due to reflections of voltage, voltage of up to about double the output voltage of the DC power source 6 is generated in the U-phase connection line 33, the V-phase connection line 34 and the W-phase connection line 35.

The surge suppression circuit 4 has a first upper diode 411 with an anode connected to the U-phase connection line 33, a second upper diode 412 with an anode connected to the V-phase connection line 34, a third upper diode 413 with an anode connected to the W-phase connection line 35, a first lower diode 421 with a cathode connected to the U-phase connection line 33, a second lower diode 422 with a cathode connected to the V-phase connection line 34, and a third lower diode 423 with a cathode connected to the W-phase connection line 35.

The surge suppression circuit 4 also has an upper line 401 connected to respective cathodes of the first to third upper diodes 411-413, a lower line 402 connected to respective anodes of the first to third lower diodes 421-423, a voltage holding circuit 5 connected between the upper line 401 and the lower line 402, and first and second inrush current suppression resistors 431, 432 to suppress inrush current into the voltage holding circuit 5.

The voltage holding circuit 5 has a charging unit 51 to store electric charge by surge voltage generated in the U-phase connection line 33, the V-phase connection line 34 and the W-phase connection line 35, and a discharge unit 52 to discharge the electric charge stored in the charging unit 51. The charging unit 51 is a capacitor. Although one capacitor is shown as the charging unit 51 in the example shown in FIG. 1, the charging unit 51 may be formed by connecting plural capacitors in series, or in parallel, or series-parallel (in series and parallel). As the capacitor, it is possible to suitably use a ceramic capacitor with high withstand voltage. However, a charging device other than the capacitor may be used as the charging unit 51 as long as it can store electric charge.

In the present embodiment, the discharge unit 52 has a discharge resistor 521 connected in parallel to the charging unit 51 between the upper line 401 and the lower line 402, and constant voltage diodes (Zener diodes) 522 series-connected to the discharge resistor 521. Although three constant voltage diodes 522 are connected in series in the example shown in FIG. 1, the number of the constant voltage diodes 522 can be appropriately changed according to breakdown voltage (Zener voltage) of the constant voltage diode 522. The constant voltage diodes 522 are connected so that the cathodes are located on the upper line 401 side and the anodes are located on the lower line 402 side.

The first inrush current suppression resistor 431 is connected between the respective cathodes of the first to third upper diodes 411-413 and the charging unit 51. The second inrush current suppression resistor 432 is connected between the respective anodes of the first to third lower diodes 421-423 and the charging unit 51. In more particular, the first inrush current suppression resistor 431 is connected between the upper line 401 and a positive terminal of the charging unit 51, and the second inrush current suppression resistor 432 is connected between the lower line 402 and a negative terminal of the charging unit 51. A resistance value of each of the first and second inrush current suppression resistors 431, 432 is, e.g., 10 Ω.

Alternatively, one of the first inrush current suppression resistor 431 and the second inrush current suppression resistor 432 may be omitted. Inrush current into the charging unit 51 can be suppressed even when one of the first inrush current suppression resistor 431 and the second inrush current suppression resistor 432 is omitted. That is, the inrush current suppression resistor only needs to be connected either between the respective cathodes of the first to third upper diodes 411-413 and the charging unit 51 or between the respective anodes of the first to third lower diodes 421-423 and the charging unit 51.

A portion of the voltage holding circuit 5 is electrically grounded. In the present embodiment, a negative terminal side of the charging unit 51 is electrically grounded through the shield conductor 24 of the electrical cable 2. By electrically grounding a portion of the voltage holding circuit 5, it is possible to further stabilize the operation of the voltage holding circuit 5. In addition, by grounding the voltage holding circuit 5 through the shield conductor 24 of the electrical cable 2, it is possible to prevent an increase in wiring (ground wires) between the switching circuit 1 and the rotating electrical machine 3.

A time constant of the charging unit 51 and the discharge resistor 521 is longer than a switching cycle of performing switching of the first to sixth switching elements 111-116 of the switching circuit 1. This allows the charging unit 51 to appropriately absorb surge voltage for a period longer than at least one switching cycle. A capacitance of the charging unit 51 is, e.g., 1 μF and a resistance value of the discharge resistor 521 is, e.g., 300 kΩ.

Figure 2A:
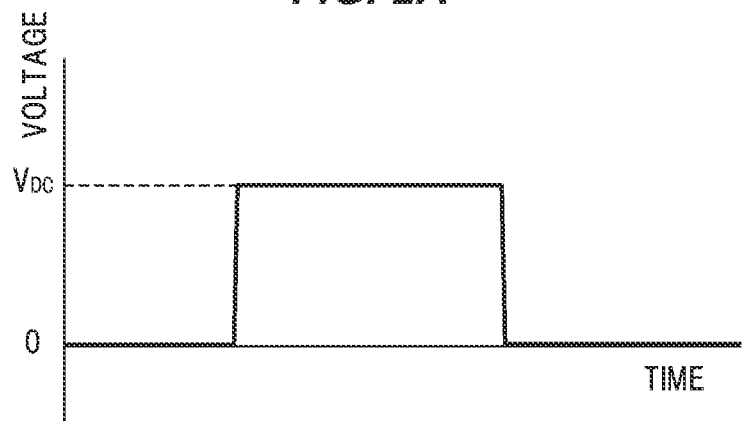
FIG. 2A is a diagram illustrating an example of a U-phase voltage waveform on a switching circuit side.
Figure 2B:
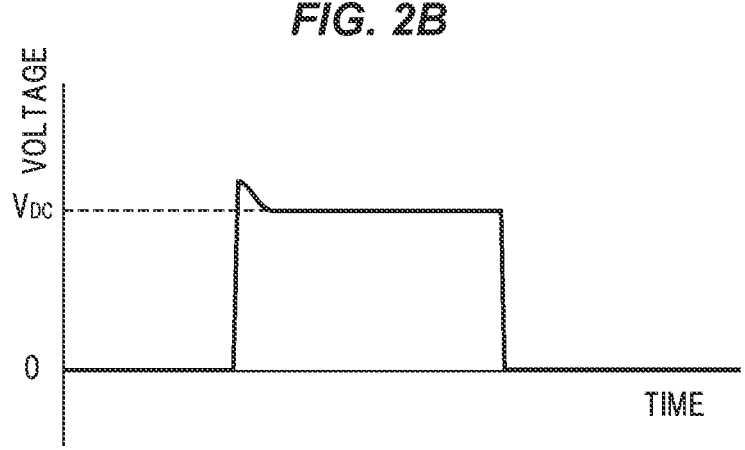
FIG. 2B is a diagram illustrating an example of a voltage waveform of a U-phase connection line.
Figure 2C:
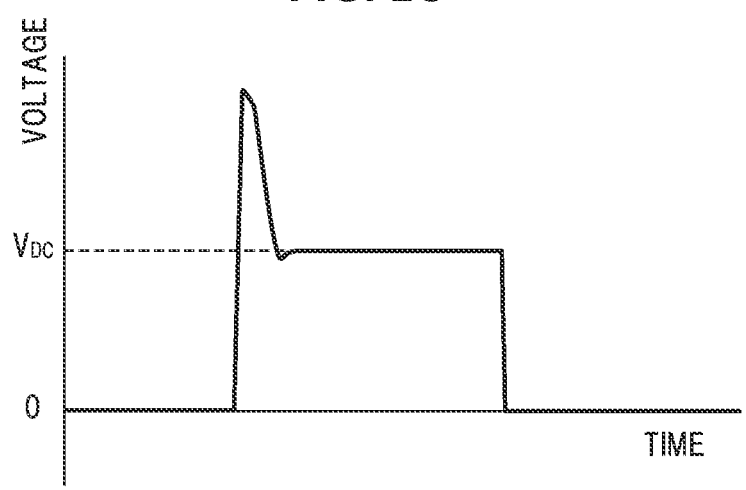
FIG. 2C is a diagram illustrating an example of a voltage waveform of the U-phase connection line when a surge suppression circuit is not provided.

FIG. 2A is a diagram illustrating an example of a U-phase voltage waveform at the connection portion 201 located on the switching circuit 1 side. FIG. 2B is a diagram illustrating an example of a voltage waveform of the U-phase connection line 33. FIG. 2C is a diagram illustrating an example of a voltage waveform of the U-phase connection line 33 when the surge suppression circuit 4 is not provided. In FIGS. 2A to 2C, the horizontal axis is a time axis and the vertical axis indicates voltage. In addition, VDC on the vertical axis is output voltage of the DC power source 6.

When the surge suppression circuit 4 is not provided, voltage from the switching circuit 1 is reflected at an end of the U-phase connection line 33 on the U-phase winding 321 side due to impedance mismatch between the electrical cable 2 and the stator 32 of the rotating electrical machine main body 30 and a large surge voltage is generated, as shown in FIG. 2C. However, in the present embodiment, surge voltage is suppressed by the surge suppression circuit 4, as shown in FIG. 2B. It is thereby possible to prevent damage on the rotating electrical machine 3 due to surge voltage.

Figure 6:
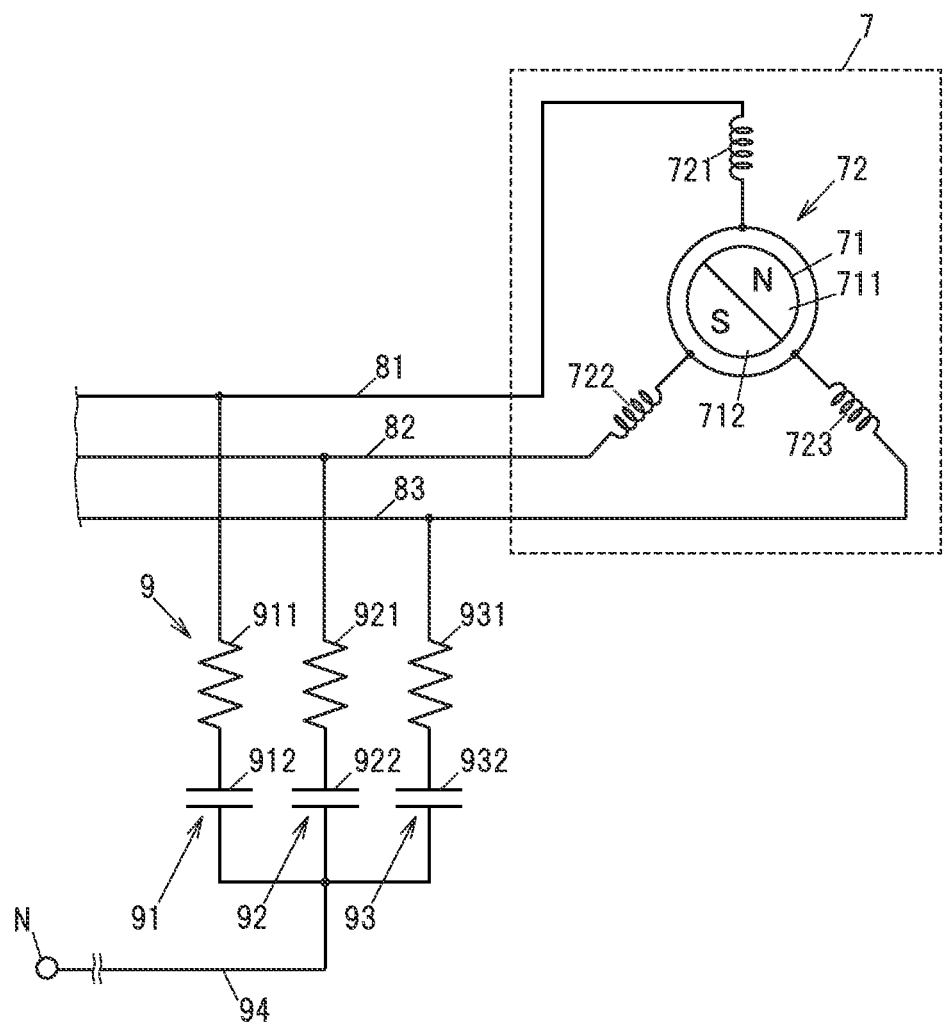
FIG. 6 is a circuit diagram illustrating an example of a conventional surge suppression circuit.

In addition, in the present embodiment, electric charge is accumulated on the charging unit 51 only when surge voltage higher than voltage at both ends of the charging unit 51 is generated. Therefore, the capacitor is not frequently charged and discharged by interphase voltage unlike, e.g., the conventional technique example shown in FIG. 6, and it is this possible to significantly reduce power loss. That is, in the present embodiment, it is possible to suppress surge voltage while suppressing power loss.

In addition, in the present embodiment, since the plural constant voltage diodes 522 are series-connected to the discharge resistor 521, voltage at both ends of the charging unit 51 is maintained at a higher value than breakdown voltage of the constant voltage diodes 522. This can further reduce power consumption of the discharge resistor 521.

Modifications of the Embodiment

Figure 3:
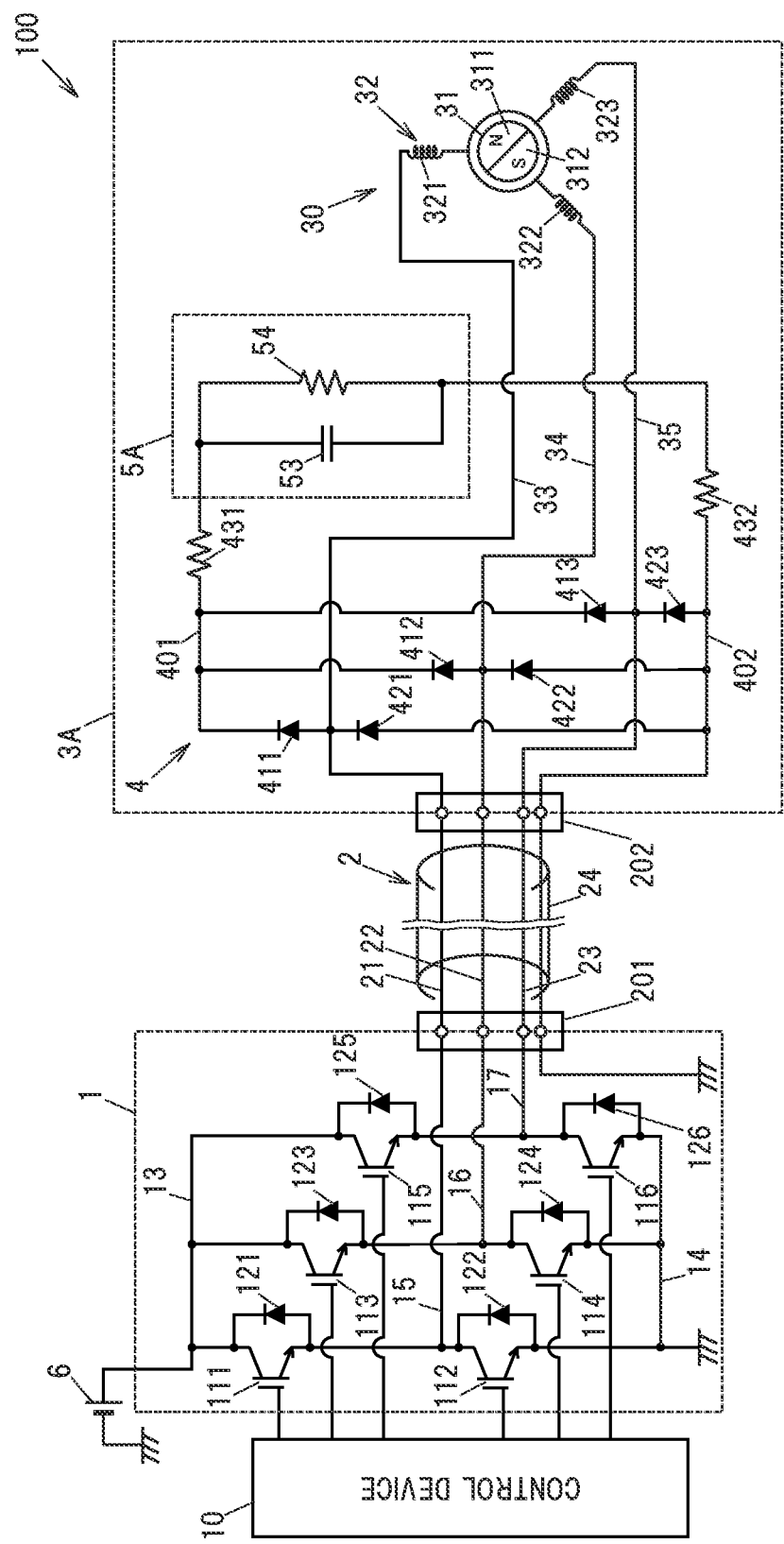
FIG. 3 is a circuit diagram illustrating a first modification.
Figure 4:
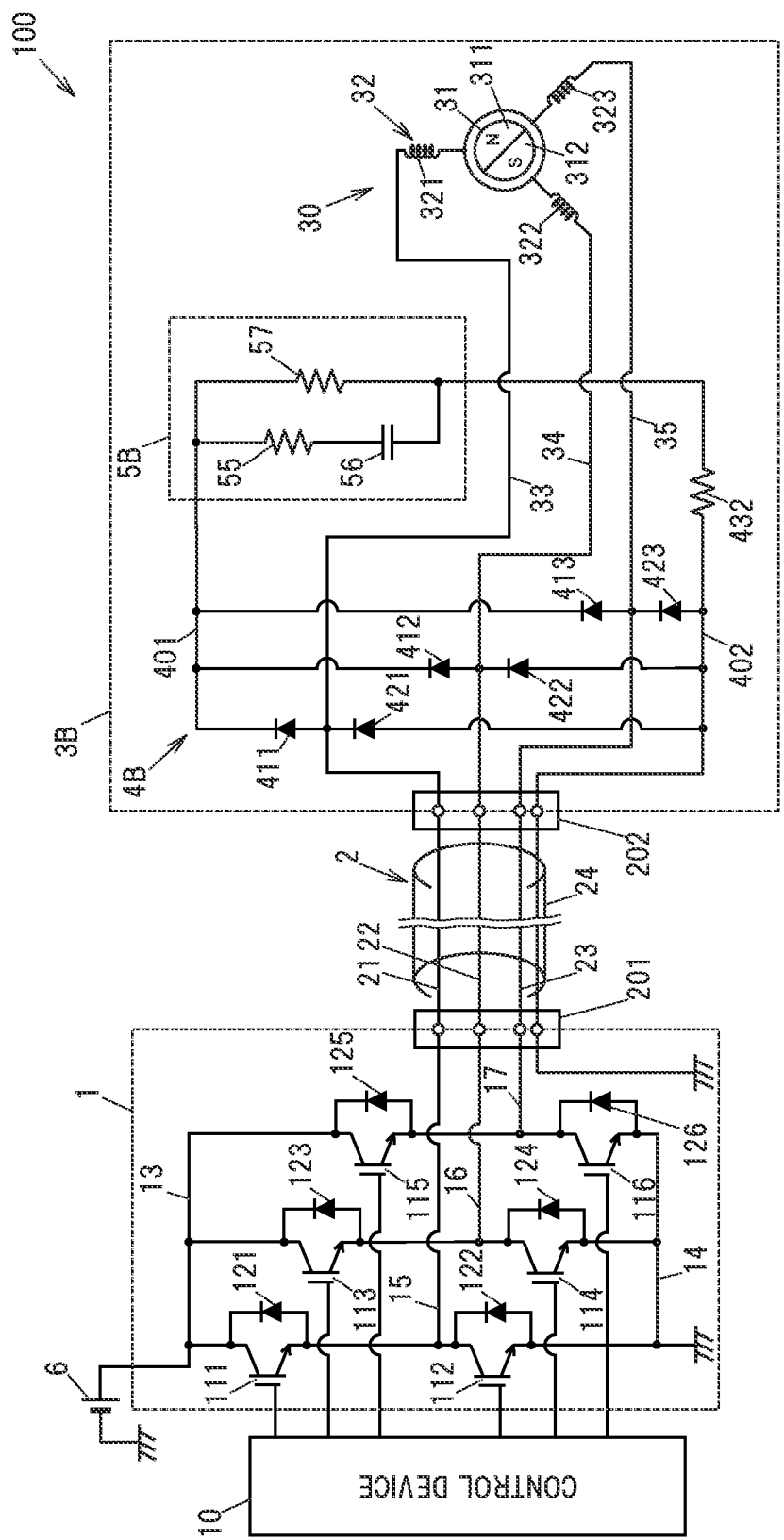
FIG. 4 is a circuit diagram illustrating a second modification.
Figure 5:
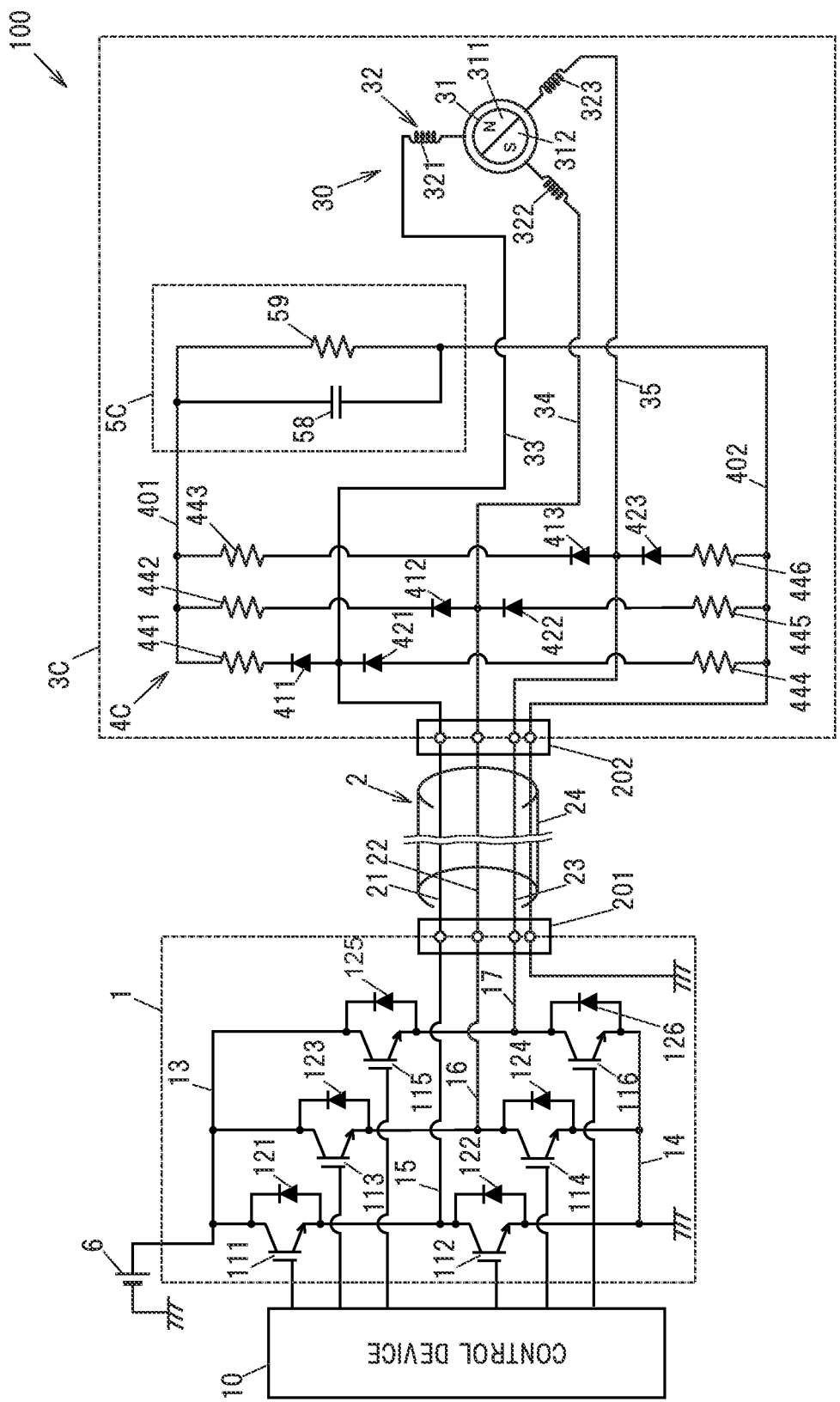
FIG. 5 is a circuit diagram illustrating a third modification.

Next, rotating electrical machines 3A, 3B and 3C in the first to third modifications will be described in reference to FIGS. 3 to 5. In FIGS. 3 to 5, the same components as those described in reference to FIG. 1 are denoted by the same reference signs as those used in FIG. 1 and overlapping explanation will be omitted.

In the rotating electrical machine 3A in the first modification shown in FIG. 3, a voltage holding circuit 5A has a configuration different from that in the first embodiment. The voltage holding circuit 5A is composed of a parallel circuit in which a charging unit 53 and a discharge resistor 54 are connected in parallel, and the discharge resistor 54 serves as the discharge unit. No constant voltage diode is connected in the voltage holding circuit 5A. The charging unit 53 is, e.g., a capacitor and has a capacitance which is lower than the capacitance of the charging unit 51 in the above-described embodiment and is, e.g., 100 nF. A resistance value of the discharge resistor 54 is higher than the resistance value of the discharge resistor 521 in the above-described embodiment and is, e.g., 500 kΩ.

In the rotating electrical machine 3B in the second modification shown in FIG. 4, a surge suppression circuit 4B does not have the first inrush current suppression resistor 431 in the above-described embodiment, but has an inrush current suppression resistor 55 in a voltage holding circuit 5B. The voltage holding circuit 5B is composed of a parallel circuit in which a series circuit of the inrush current suppression resistor 55 and a charging unit 56 is parallel-connected to a discharge resistor 57 as the discharge unit. A resistance value of the inrush current suppression resistor 55 is, e.g., 25 kΩ. A capacitance of the charging unit 56 and a resistance value of the discharge resistor 57 are respectively, e.g., 100 nF and 500 kΩ.

In the rotating electrical machine 3C in the third modification shown in FIG. 5, a surge suppression circuit 4C includes first to sixth inrush current suppression resistors 441-446 in place of the first and second inrush current suppression resistor 431, 432 in the above-described embodiment. The first to third inrush current suppression resistors 441-443 are respectively connected between the cathodes of the first to third upper diodes 411-413 and the upper line 401. The fourth to sixth inrush current suppression resistors 444-446 are respectively connected between the anodes of the first to third lower diodes 421-423 and the lower line 402. A resistance value of each of the first to sixth inrush current suppression resistors 441-446 is, e.g., 25 kΩ.

A voltage holding circuit 5C of the rotating electrical machine 3C is composed of a parallel circuit in which a charging unit 58 and a discharge resistor 59 as the discharge unit are connected in parallel, in the same manner as the voltage holding circuit 5A in the first modification shown in FIG. 3. A capacitance of the charging unit 58 and a resistance value of the discharge resistor 59 are respectively, e.g., 100 nF and 500 kΩ, in the same manner as the first modification.

In the rotating electrical machines 3A, 3B and 3C in the first to third modifications, it is possible to suppress surge voltage while suppressing power loss, in the same manner as the above-described embodiment.

Summary of the Embodiment

Technical ideas understood from the embodiment will be described below citing the reference signs, etc., used for the embodiment. However, each reference sign, etc., described below is not intended to limit the constituent elements in the claims to the members, etc., specifically described in the embodiment.

[1] A surge suppression circuit (4, 4B, 4C) that is configured to be used in a rotating electrical machine system (100) comprising a switching circuit (1) comprising a plurality of switching elements (111-116) and a rotating electrical machine (3, 3A, 3B, 3C) connected thereto via an electrically conducting path (the electrical cable 2) comprising a plurality of electrically conductive bodies (the wires 21-23), and suppresses surge voltage generated in a plurality of connecting lines (33, 34, 35) connecting the plurality of electrically conductive bodies (the wires 21-23) to windings of plural phases (321, 322, 323) of the rotating electrical machine (3), the surge suppression circuit (4, 4B, 4C) comprising: a plurality of upper diodes (411-413) with anodes respectively connected to the plurality of connection lines (33, 34, 35); a plurality of lower diodes (421-423) with cathodes respectively connected to the plurality of connection lines (33, 34, 35); an upper line (401) connected to respective cathodes of the plurality of upper diodes (411-413); a lower line (402) connected to respective anodes of the plurality of lower diodes (421-423); and a voltage holding circuit (5, 5A, 5B, 5C) connected between the upper line (401) and the lower line (402), wherein the voltage holding circuit (5, 5A, 5B, 5C) comprises a charging unit (51, 53, 56, 58) to store electric charge by the surge voltage and a discharge unit (52, 54, 57, 59) to discharge the electric charge stored in the charging unit (51, 53, 56, 58).

[2] The surge suppression circuit (4, 4B, 4C) defined by [1], wherein the charging unit (51, 53, 56, 58) comprises a capacitor connected between the upper line (401) and the lower line (402).

[3] The surge suppression circuit (4, 4B, 4C) defined by [1] or [2], wherein the discharge unit (52, 54, 57, 59) comprises a discharge resistor (521, 54, 57, 59) connected in parallel to the charging unit (51, 53, 56, 58) between the upper line (401) and the lower line (402).

[4] The surge suppression circuit (4) defined by [3], wherein the discharge unit (52) comprises at least one constant voltage diode (522) having a cathode on the upper line (401) side, and wherein the discharge resistor (521) is connected in series to the constant voltage diode (522).

[5] The surge suppression circuit (4, 4B, 4C) defined by any one of [2] to [4], wherein a time constant of the charging unit (51, 53, 56, 58) and the discharge resistor (521, 54, 57, 59) is longer than a switching cycle of performing switching of the plurality of switching elements (111-116).

[6] The surge suppression circuit (4, 4B, 4C) defined by any one of [1] to [5], wherein an inrush current suppression resistor (431, 432, 441-446) to suppress inrush current into the charging unit (51, 53, 56, 58) is connected at least between the respective cathodes of the plurality of upper diodes (411-413) and the charging unit (51, 53, 56, 58) or between the respective anodes of the plurality of lower diodes (421-423) and the charging unit (51, 53, 56, 58).

[7] The surge suppression circuit (4, 4B, 4C) defined by any one of [1] to [6], wherein the plurality of electrically conductive bodies comprise a plurality of electric wires (21-23), and wherein a portion of the voltage holding circuit (5, 5A, 5B, 5C) is electrically grounded through a shield conductor (4) that shields the plurality of electric wires (21-23).

[8] A rotating electrical machine (3, 3A, 3B, 3C) to be connected to a switching circuit (1) comprising a plurality of switching elements (111-116) via an electrically conducting path (the electrical cable 2) comprising a plurality of electrically conductive bodies (the wires 21-23), the rotating electrical machine (3, 3A, 3B, 3C) comprising: a rotating electrical machine main body (30) comprising windings of plural phases (321, 322, 323); a plurality of connection lines (33-35) to connect the plurality of electrically conductive bodies (the wires 21-23) to the windings of plural phases (321, 322, 323); and a surge suppression circuit (4, 4B, 4C) to suppress surge voltage generated in the plurality of connecting lines (33-35), wherein the surge suppression circuit (4, 4B, 4C) comprises a plurality of upper diodes (411-413) with anodes respectively connected to the plurality of connection lines (33, 34, 35), a plurality of lower diodes (421-423) with cathodes respectively connected to the plurality of connection lines (33, 34, 35), an upper line (401) connected to respective cathodes of the plurality of upper diodes (411-413), a lower line (402) connected to respective anodes of the plurality of lower diodes (421-423), and a voltage holding circuit (5, 5A, 5B, 5C) connected between the upper line (401) and the lower line (402), and wherein the voltage holding circuit (5, 5A, 5B, 5C) comprises a charging unit (51, 53, 56, 58) to store electric charge by the surge voltage and a discharge unit (52, 54, 57, 59) to discharge the electric charge stored in the charging unit (51, 53, 56, 58).

Although the embodiment of the invention has been described, the invention according to claims is not to be limited to the embodiment described above. Further, please note that not all combinations of the features described in the embodiment are necessary to solve the problem of the invention.

The invention claimed is:

1. A surge suppression circuit that is configured to be used in a rotating electrical machine system comprising a switching circuit comprising a plurality of switching elements and a rotating electrical machine connected thereto via an electrically conducting path comprising a plurality of electrically conductive bodies, and suppresses surge voltage generated in a plurality of connecting lines connecting the plurality of electrically conductive bodies to windings of plural phases of the rotating electrical machine, the surge suppression circuit comprising:
   a plurality of upper diodes with anodes respectively connected to the plurality of connection lines;
   a plurality of lower diodes with cathodes respectively connected to the plurality of connection lines;
   an upper line connected to respective cathodes of the plurality of upper diodes;
   a lower line connected to respective anodes of the plurality of lower diodes; and
   a voltage holding circuit connected between the upper line and the lower line,
   wherein the voltage holding circuit comprises a charging unit to store electric charge by the surge voltage and a discharge unit to discharge the electric charge stored in the charging unit, and
   wherein an inrush current suppression resistor to suppress inrush current into the charging unit is connected at least between the respective cathodes of the plurality of upper diodes and the charging unit or between the respective anodes of the plurality of lower diodes and the charging unit.

2. The surge suppression circuit according to claim 1, wherein the charging unit comprises a capacitor connected between the upper line and the lower line.

3. The surge suppression circuit according to claim 1, wherein the discharge unit comprises a discharge resistor connected in parallel to the charging unit between the upper line and the lower line.

4. The surge suppression circuit according to claim 3, wherein the discharge unit comprises at least one constant voltage diode having a cathode on the upper line side, and wherein the discharge resistor is connected in series to the constant voltage diode.

5. The surge suppression circuit according to claim 3, wherein a time constant of the charging unit and the discharge resistor is longer than a switching cycle of performing switching of the plurality of switching elements.

6. The surge suppression circuit according to claim 1,
   wherein the plurality of electrically conductive bodies comprise a plurality of electric wires, and
   wherein a portion of the voltage holding circuit is electrically grounded through a shield conductor that shields the plurality of electric wires.

7. A rotating electrical machine to be connected to a switching circuit comprising a plurality of switching elements via an electrically conducting path comprising a plurality of electrically conductive bodies, the rotating electrical machine comprising:
   a rotating electrical machine main body comprising windings of plural phases;
   a plurality of connection lines to connect the plurality of electrically conductive bodies to the windings of plural phases; and
   a surge suppression circuit to suppress surge voltage generated in the plurality of connecting lines,
   wherein the surge suppression circuit comprises a plurality of upper diodes with anodes respectively connected to the plurality of connection lines, a plurality of lower diodes with cathodes respectively connected to the plurality of connection lines, an upper line connected to respective cathodes of the plurality of upper diodes, a lower line connected to respective anodes of the plurality of lower diodes, and a voltage holding circuit connected between the upper line and the lower line,
   wherein the voltage holding circuit comprises a charging unit to store electric charge by the surge voltage and a discharge unit to discharge the electric charge stored in the charging unit, and
   wherein an inrush current suppression resistor to suppress inrush current into the charging unit is connected at least between the respective cathodes of the plurality of upper diodes and the charging unit or between the respective anodes of the plurality of lower diodes and the charging unit.

* * * * *